(12) United States Patent
Iyoshi (10) Patent No.: US 10,802,037 B2
(45) Date of Patent: Oct. 13, 2020

(54) METHODS AND SYSTEMS FOR MOTOR CONTROL

(71) Applicant: SEMICONDUCTOR COMPONENTS INDUSTRIES, LLC, Phoenix, AZ (US)

(72) Inventor: Kentaro Iyoshi, O-izumi-machi (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 40 days.

(21) Appl. No.: 16/220,161

(22) Filed: Dec. 14, 2018

(65) Prior Publication Data

US 2020/0191818 A1   Jun. 18, 2020

(51) Int. Cl.
*H02P 27/08* (2006.01)
*G01P 3/48* (2006.01)
*H02P 6/16* (2016.01)
*H02K 11/215* (2016.01)

(52) U.S. Cl.
CPC .............. *G01P 3/48* (2013.01); *H02P 6/16* (2013.01); *H02P 27/08* (2013.01); *H02K 11/215* (2016.01)

(58) Field of Classification Search
CPC .......... H02P 6/185; H02P 27/08; H02P 23/14; H02P 21/141; H02P 21/18; H02P 6/17; H02P 21/22
See application file for complete search history.

(56) References Cited

U.S. PATENT DOCUMENTS

| 8,023,216 | B1* | 9/2011 | Cheung | G11B 5/59633 |
| | | | | 360/51 |
| 2015/0062676 | A1 | 3/2015 | Nito | |
| 2015/0338763 | A1* | 11/2015 | Azumai | G03G 21/14 |
| | | | | 347/132 |
| 2017/0146938 | A1* | 5/2017 | Kuroki | G03G 15/80 |
| 2017/0268865 | A1 | 9/2017 | Kimata | |

* cited by examiner

*Primary Examiner* — Rina I Duda
(74) *Attorney, Agent, or Firm* — The Noblitt Group, PLLC; Hettie L. Haines (57) ABSTRACT

Various embodiments of the present technology comprise a method and system for motor control. Various embodiments of the present technology may comprise a control circuit that computes an adjusted rotational speed to compensate for a clock signal that deviates from an ideal (expected) clock signal value.

19 Claims, 6 Drawing Sheets

METHODS AND SYSTEMS FOR MOTOR CONTROL

BACKGROUND OF THE TECHNOLOGY

Conventional motor systems operate according to a clock signal. The system may use the clock signal to determine the rotational speed of the motor and, in turn, use the clock signal to increase or decrease the rotational speed of the motor to reach a target rotational speed. The clock used to generate the clock signal may introduce errors in the clock signal. Therefore, the resulting clock signal is not accurate and, in turn, control of the motor's rotational speed is affected by the error in the clock signal.

SUMMARY OF THE INVENTION

Various embodiments of the present technology comprise a method and system for motor control. Various embodiments of the present technology may comprise a control circuit that computes an adjusted rotational speed to compensate for a clock signal that deviates from an ideal (expected) clock signal value.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various motors, clocks generators, sampling circuits, voltage shifters, counters, drivers, and the like, which may carry out a variety of functions. In addition, the present technology may be practiced in conjunction with any number of motor systems, such as a single-phase motor system, a 3-phase motor system, and the like, and the motor systems described are merely exemplary applications for the technology. Further, the present technology may employ any number of conventional techniques for sampling data, performing arithmetic functions, detecting back EMF (electromotive force), detecting zero-crossing points, and the like.

Figure 1:
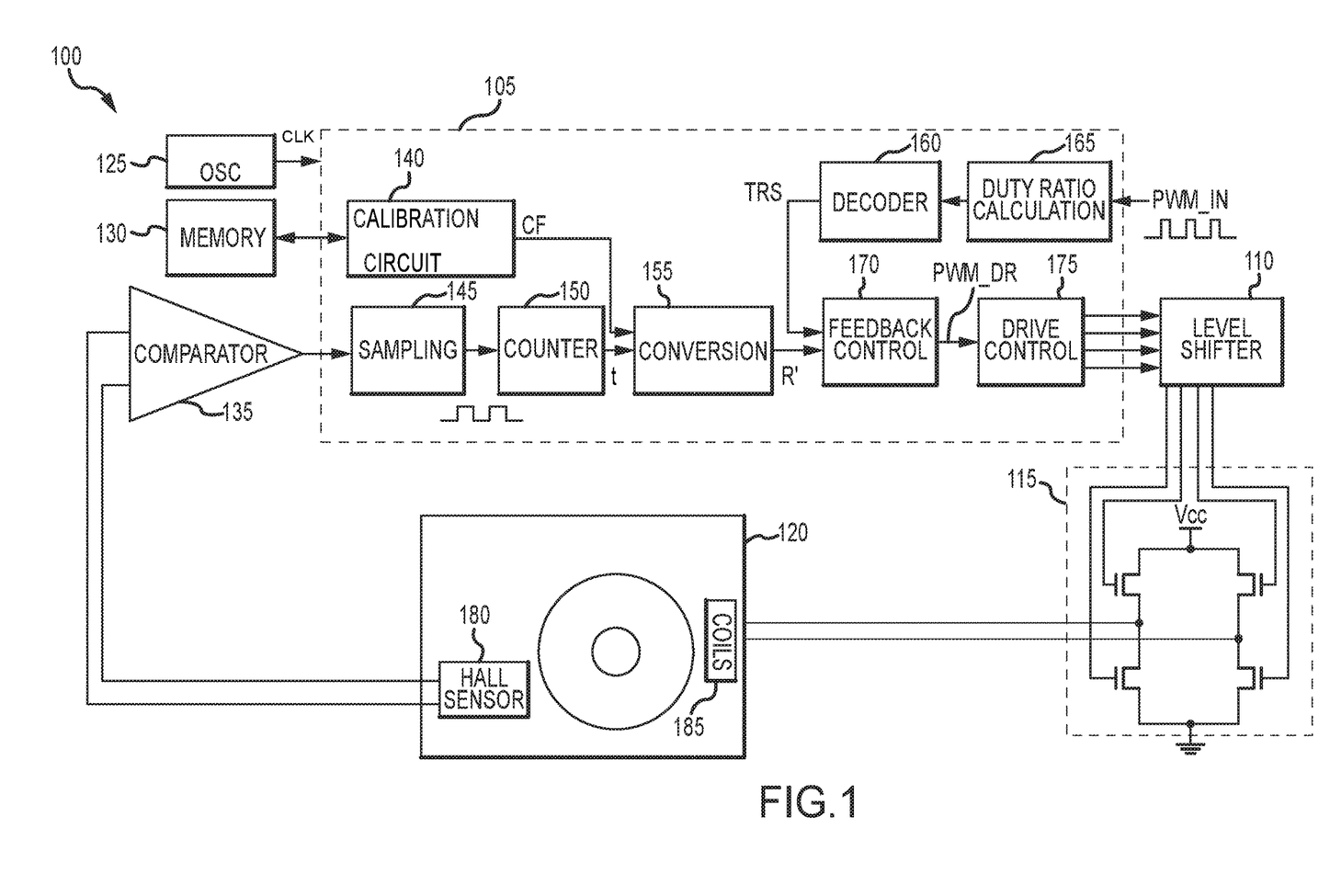
FIG. 1 is a block diagram of a motor system in accordance with a first embodiment of the present technology.
Figure 2:
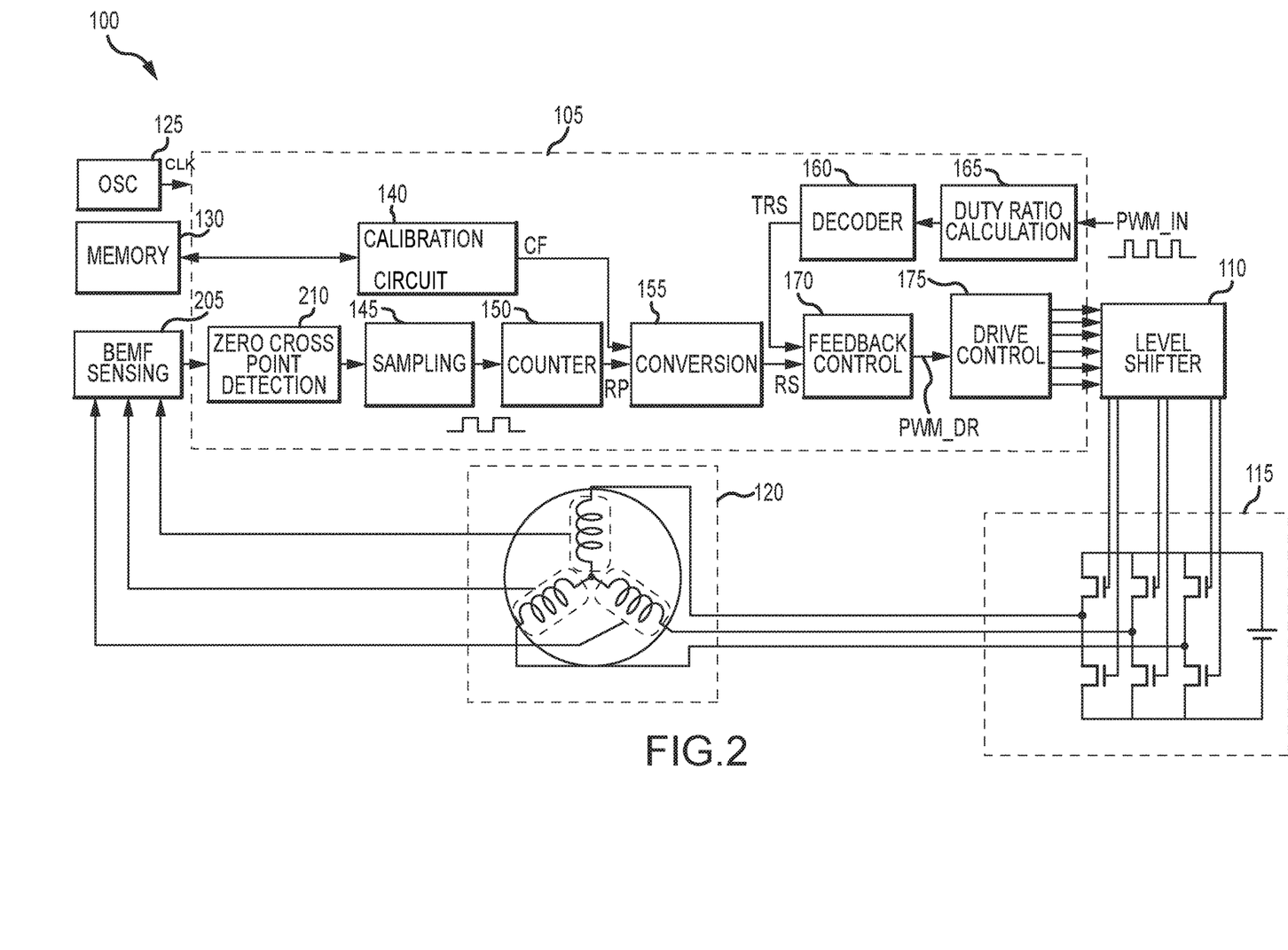
FIG. 2 is a block diagram of a motor system in accordance with a second embodiment of the present technology.

Methods and systems for motor control according to various aspects of the present technology may operate in conjunction with any suitable electronic system and/or device that uses a motor to convert supplied electrical energy into mechanical energy. Referring to FIGS. 1 and 2, a motor system 100 may comprise various components suitable for detecting and/or controlling a rotational speed of a motor 120. For example, the motor system 100 may comprise a clock generator circuit 125 that operates in conjunction with a control circuit 105.

According to various embodiments, the motor 120 is configured to convert electrical energy into mechanical energy. For example, the motor 120 may comprise a single-phase motor (such as illustrated in FIG. 1) or 3-phase motor (such as illustrated in FIG. 2). In the case of a single-phase motor, the motor 120 further comprises a set of coils 185 that are responsible for controlling the rotational speed of the motor 120 and a hall sensor 180 to generate a hall sensor signal in response to a detected rotational speed.

According to various embodiments, the motor system 100 may comprise a feedback circuit configured to measure and/or detect an actual rotational speed of the motor 120. For example, in the case where the motor 120 comprises a single-phase motor, the motor system 100 may further comprise a comparator 135. A first input terminal and a second input terminal of the comparator 135 may be connected to the hall sensor 180 to detect an orientation of a rotating part of the motor 120 by measuring variations in the magnetic field. The comparator 135 may be configured to generate a comparator output signal at an output terminal according to output signals from the hall sensor 180. The comparator 135 may, in turn, provide position and/or rotational information of the motor 120, according to the output signals from the hall sensor 180, back to the control circuit 105.

In a case where the motor 120 comprises a 3-phase motor, the motor system 100 may further comprise a BEMF circuit 205 and a zero-crossing point detection circuit 210 that operate in conjunction with each other to enable position recognition of the motor 120. The BEMF circuit 205 may be configured to sense back EMF (the voltage induced into a stator winding due to rotor movement) of motor 120 and generate a back EMF signal. The BEMF circuit 205 may comprise any circuit and/or system suitable for detecting back EMF.

The zero-crossing point detection circuit 210 may detect the zero-crossing points of the back EMF signal and generate a zero-crossing signal. The zero-crossing point detection circuit 210 may comprise any circuit and/or system suitable for detecting zero-crossing points of a signal.

The BEMF circuit 205 together with the zero-crossing point detection circuit 210 may, in turn, provide position and/or rotational information of the motor 120 back to the control circuit 105.

In various embodiments, the clock generator circuit 125 may be configured to generate a clock signal CLK with an actual frequency f' and transmit the clock signal CLK to the control circuit 105. The actual frequency f' of the clock signal CLK may deviate from an ideal (expected) frequency f. In such a case, the clock generator circuit 125 via the clock signal CLK may introduce an error (a difference between the ideal frequency f and the actual frequency f') into the motor system 100. The error may propagate throughout the motor system 100, which contributes to errors in the detection of the rotational speed of the motor 120 and inability to control the rotational speed of the motor 120 as desired.

For example, in an ideal case, a rotational speed of the motor 120 is represented as: R=C/t, where C is a constant, t is an ideal counter value (when clock frequency is also ideal) according to a counter 150, which corresponds to the length of time for one rotation cycle of the motor 120. The constant C is a predetermined value based on the ideal clock frequency f, and characteristics of the motor 120, such as a number of phases of the motor 120, a number of poles of the motor 120, and a number of slots of the motor 120. However, due to errors introduced by the clock signal CLK, the actual clock frequency f' results in a deviation between an actual rotational speed R' of the motor 120 and the ideal rotational speed R. Such deviation may be described according to the following derivation:

$$R' = \frac{C}{t'}$$

$$= \frac{C}{\left(t \times \frac{f \pm \Delta f}{f}\right)}$$

$$= \frac{C}{t} \times \frac{f}{f \pm \Delta f}$$

$$= \frac{f}{f \pm \Delta f} R$$

$$= \frac{f \pm \Delta f}{f \pm \Delta f} R - \frac{\pm \Delta f}{f \pm \Delta f} R$$

$$= R \mp \frac{\Delta f}{f \pm \Delta f} R$$

(Equation 1), where R' is the actual rotational speed that contains an error due to the non-ideal (actual) clock frequency, and $\Delta f$ is the difference between the ideal frequency f and the actual frequency f'.

According to various embodiments, the control circuit 105 may be configured to detect and/or control the rotational speed of the motor 120. The control circuit 105 may be connected to the motor 120 and may comprise various circuits to perform various functions, such as sampling, conversion, feedback control, counting, decoding, generating a drive signal, and computing. For example, according to various embodiments, the control circuit 105 may comprise a compensation circuit 140, a sampling circuit 145, the counter 150, a conversion circuit 155, a feedback control circuit 170, and a drive controller 175.

The calibration circuit 140 may be configured to determine and compensate for errors in the motor system 100. For example, the calibration circuit 140 may be configured to generate and transmit a compensation factor CF to the conversion circuit 155. The calibration circuit 140 may comprise any number of devices and/or components suitable for performing arithmetic functions, such as logic gates, discrete components (e.g., resistors and capacitors), transistors, and the like.

For example, the calibration circuit 140 may be configured to compute a first compensation factor CF, such as a compensated constant C', according to the following:

$$C' = \frac{f \pm \Delta f}{f} C$$

(Equation 2), where f is the ideal clock frequency, $\Delta f$ is the difference between the ideal frequency f and the actual frequency f', and C is the constant.

The calibration circuit 140 may be further configured to compute a second compensation factor CF, such as a change in constant $\Delta C$, according to the following:

$$\Delta C = C' - C = \frac{f \pm \Delta f}{f} C - C = \frac{\pm \Delta f}{f} C$$

(Equation 3), where f is the ideal clock frequency, $\Delta f$ is the difference between the ideal frequency f and the actual frequency f', and C is the constant, and C' is the compensated constant.

The calibration circuit 140 may be further configured to transmit the compensated constant C' and/or the change in constant $\Delta C$ to the conversion circuit 155. For example, an output terminal of the calibration circuit 140 may be connected to an input terminal of the conversion circuit 155.

The sampling circuit 145 may be configured to sample an input signal. For example, in one embodiment, the sampling circuit 145 may be connected to the output terminal of the comparator 135 and configured to sample a comparator output signal. In an alternative embodiment, the sampling circuit 145 may be connected to an output terminal of the zero-crossing point detection circuit 210 and configured to sample a zero-crossing signal. The sampling circuit 145 may comprise any suitable circuit for sampling a voltage of a continuous-time signal, holding the value for some period of time, and generating a discrete-time signal according to the sampled values, such as a conventional sample-and-hold circuit.

The counter circuit 150 may be configured to measure a cycle time of the motor 120 and generate an actual counter value t' that represents the length of time for a specified rotation cycle of the motor 120. For example, the specified rotation cycle may be defined as one full rotation cycle or a half rotation cycle. In one embodiment, a total rotational period T (measured in seconds) of the motor 120 may be described as: T=2t/f; where f is the ideal clock frequency and t is an ideal counter value for a half rotation cycle of the motor 120. However, due to the error in the clock signal CLK, the total rotational period T may be described as: T=2t'/(f±$\Delta f$), where t' is an actual counter value. Therefore, the actual counter value t' is described as: t'=[(f±$\Delta f$)/f]t.

In an alternative embodiment, the total rotational period T (measured in seconds) of the motor 120 may be described as: T=t/f, where f is the ideal clock frequency and t is an ideal counter value for a full rotation cycle of the motor 120. However, due to the error in the clock signal CLK, the total rotational period T may be described as: T=t'/(f±$\Delta f$), where t' is an actual counter value.

In alternative embodiments, the equation used to describe the total rotational period T may be based on the type of motor 120 that is used, as the mathematical relationship between the rotational period T, counter value t, and frequency f vary based on the type of motor.

In an exemplary embodiment, the counter circuit 150 may be connected to an output terminal of the sampling circuit 145 and generate the actual counter value t' according to the sampling circuit 145 outputs. The counter circuit 150 may be further configured to transmit the actual counter value t' to the conversion circuit 155. The counter circuit 150 may comprise any suitable circuit for measuring periods, such as a conventional frequency counter.

The conversion circuit 155 may be configured to compute the actual rotational speed R' of the motor 120. For example, the conversion circuit 155 may be configured to compute the actual rotational speed R' according to the following:

$$R' = \frac{C\prime}{t\prime} = \frac{\left(C \times \frac{f \pm \Delta f}{f}\right)}{\left(t \times \frac{f \pm \Delta f}{f}\right)} = \frac{C}{t} = R$$

(Equation 4), where the actual rotational speed R' is measured in revolutions per minute (RPM), C' is the compensated constant, and t' is the actual counter value, f is the ideal clock frequency, and $\Delta f$ is the difference between the ideal clock frequency f and the actual clock frequency f'. The conversion circuit 155 may transmit the computed actual rotational speed R' to the feedback control circuit 170. The conversion circuit 155 may comprise any suitable circuit and/or system capable of performing various arithmetic functions, such as those required in Equation 4.

According to various embodiments, the control circuit 105 may further comprise a duty ratio calculation circuit 165 configured to receive a pulse-width modulation input (PWM_IN) signal and compute a duty ratio DR of the PWM_IN signal. The duty ratio calculation circuit 165 may transmit the duty ratio DR to a decoder 160 configured to decode the duty ratio DR, wherein the decoded duty ratio represents a target rotational speed TRS (measured in RPM). In other words, the decoder 160 converts the duty ratio DR into the target rotational speed TRS. The decoder 160 may be configured to transmit the target rotational speed TRS to the feedback control circuit 170.

The feedback control circuit 170 may be configured to receive various signals and feedback signals. For example, the feedback control circuit 170 may be configured to receive the target rotational speed TRS and the actual detected rotational speed R' as inputs. The feedback control circuit 170 may utilize the target rotational speed TRS and the actual rotational speed R' to generate a drive PWM signal (PWM_DR).

According to various embodiments, the motor system 100 may further comprise a drive control circuit 175, a level shifter circuit 110, and a driver 115 that operate together to generate a desired electrical energy and supply the energy to the motor 120.

The drive control circuit 175 may be connected to an output terminal of the feedback control circuit 170, receive the drive PWM signal and generate a drive signal (drive current or drive voltage) according to the drive PWM signal. The drive control circuit 175 may transmit the drive signal to the level shifter circuit 110. According to various embodiments, the drive control circuit 175 may comprise any circuit and/or system suitable for generating a drive current or a drive voltage according to an input signal, such as the drive PWM signal.

The level shifter circuit 110 may be configured to shift (increase or decrease) the drive current or the drive voltage from the drive control circuit 175 to ensure compatibility with the driver 115 and generate a shifted drive signal. For example, the level shifter circuit 110 may increase the voltage of the signal from the drive control circuit 175 to a supply voltage Vcc in order to control transistors in the driver 115. The level shifter circuit 110 may comprise any circuit and/or system suitable for translating signals from one logic level or voltage domain to another.

The driver 115 may receive the shifted drive signal from the level shifter circuit 110 and operate according to the shifted drive signal to drive and/or control the operation of the motor 120. The driver 115 may comprise any circuit and/or system suitable for driving a motor. For example, the driver 115 may comprise a plurality of transistors arranged to provide a desired driver architecture, such as an H-bridge driver or a 3-phase driver.

According to various embodiments, the control circuit 105 and/or the calibration circuit 140 may be connected to and/or have access to a memory 130. The memory 130 may comprise any suitable memory type, for example the memory 130 may comprise a non-volatile memory device. The memory 130 may be used to store relevant values, such as the frequency deviation $\Delta f$ and the compensated constant C'.

According to various embodiments, the memory 130 may be configured to store a binary number that represents the constant C and/or the compensated constant C'. For example, the constant C, the compensated constant C', and/or the change in constant $\Delta C$ may be represented by a number of bits, such as 1101010011110001110 (represented using 19 bits). The number of bits used to represent the constant C and/or the compensated constant C' may be based on the desired accuracy of the variables, the specifications of the memory 130, and/or other particulars of the motor system 100.

According to various embodiments, the memory 130 may be configured to store a variable portion $C_1'$ of the binary number. For example, if the constant C and/or the compensated constant C' is represented as 11010100111100001110, then the memory 130 may store a signed 8-bit number, such as bit positions 8-16 (i.e., $C_1'$=010100111). The constant C may be multiplied by a step factor resulting in a range of values to account for possible values of the compensated constant C' and the variable portion C'.

According to various embodiments, various components, such as the motor 120, the control circuit 105, the memory 130, and the like, may be capable of communicating with a test system (not shown). The test system may be implemented as a separate electronic device used to measure various characteristics of the motor system 100, such as voltage, current, frequency, and time. The test system may be further configured to detect various output signals from the components and/or provide specific signal patterns (e.g., square waveforms) to the components that are undergoing testing. The testing system may be further configured to program and/or erase the memory 130. The test system may be further configured to perform various calculations, such as calculating the compensated constant C' and/or the calculating the frequency deviation $\Delta f$. The test system may comprise any circuits and/or systems suitable for measuring device characteristics such as voltage, current, frequency, and time. For example, the test system may comprise various detection circuits, such as a voltage detection circuit and a current detection circuit. The test system may further comprise various circuits and/or systems suitable for performing various arithmetic functions. For example, the test system may comprise a logic circuit formed from logic gates, flip flops, and other combinational logic circuits configured to perform desired arithmetic functions, such as addition and/or subtraction to compute the deviation frequency $\Delta f$ and/or the compensated constant C'.

According to various operations, the methods for controlling the motor 120 comprise calibrating the motor system 100 so that motor control and/or the rotation speed can be more accurately controlled and/or detected. According to various operations, the methods for controlling the motor 120 comprise removing and/or compensating for error introduced by the clock signal CLK.

According to various operations, the motor system 100 may operate according to three stages: a first stage (a test stage), a second stage (a calibration/initialization stage), and a third stage (an operational stage). The first stage may comprise measuring the actual clock frequency f' and computing the frequency deviation (Δf). In some operations, the first stage may further comprise calculating the change in constant ΔC. The second stage may comprise powering the motor system 100, and calculating the compensated constant C'. The third stage may comprise generating the actual counter value t', calculating the actual rotational speed R' and/or controlling the rotational speed R'.

Figure 3:
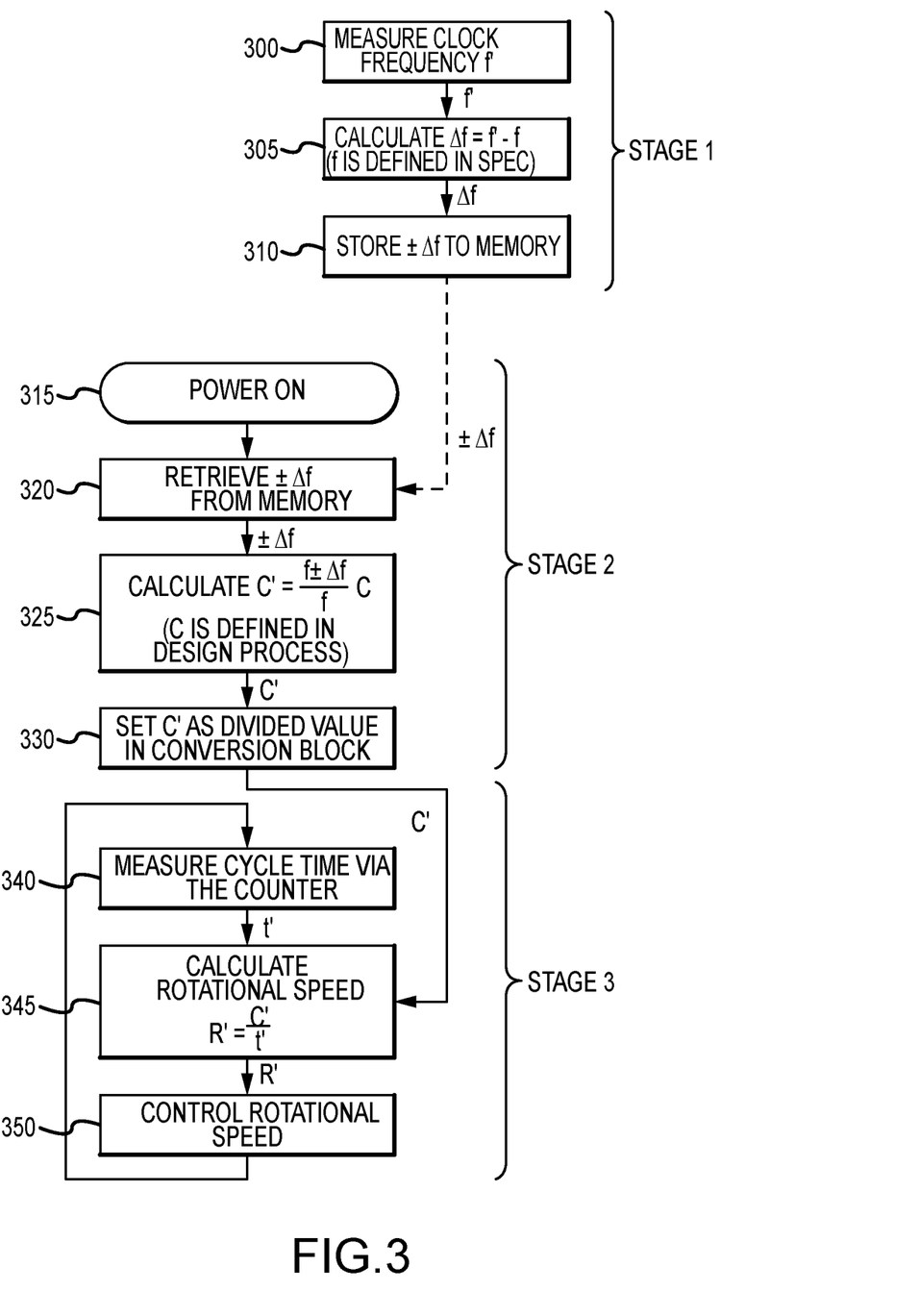
FIG. 3 is a first flowchart for operating a motor system in accordance with various embodiments of the present technology.

In a first method, and referring to FIG. 3, the first stage may comprise measuring the actual clock frequency f' (300), calculating the frequency deviation Δf using the test system (not shown) (305), and storing the frequency deviation value Δf in the memory 130 (310). The second stage may comprise powering the motor system (315), retrieving the frequency deviation value Δf from the memory 130 (320), calculating the compensated constant C' according to Equation 2 using the calibration circuit 140 (325), and transmitting the calculated compensated constant C' to the conversion circuit 155 (330). The third stage may comprise calculating the actual rotational speed R' using the calculated compensated constant C' and the conversion circuit 155 (345), controlling the rotational speed using the feedback control circuit 170, the drive control circuit 175, the level shifter circuit 110, the driver 115, the duty ratio calculation circuit 165 and/or the decoder 160 (350), measuring the cycle time via the counter 150 and generating the actual counter value t' (340), and updating the rotational speed (345) according to the actual counter value t'.

Figure 4:
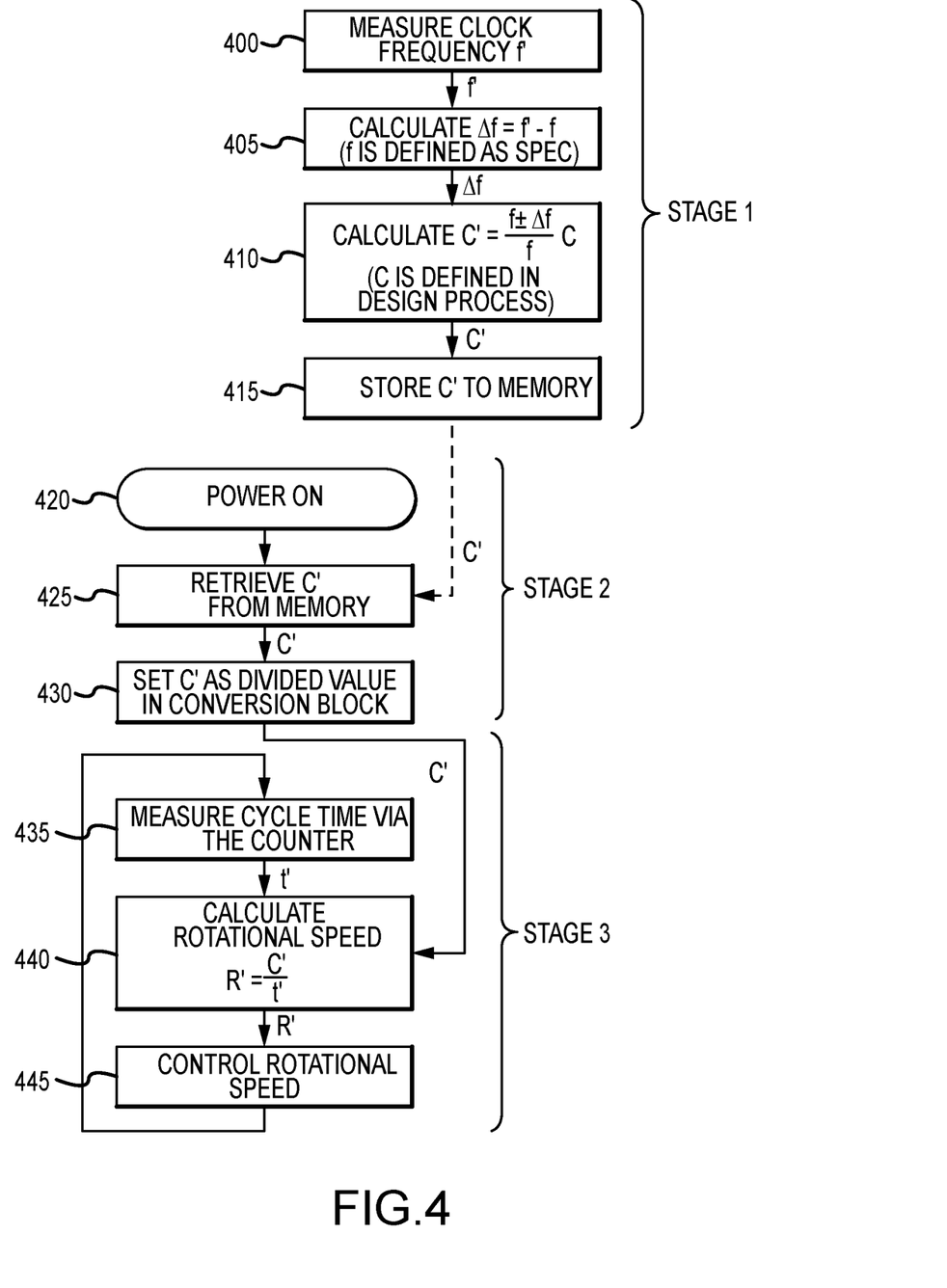
FIG. 4 is a second flowchart for operating a motor system in accordance with various embodiments of the present technology.

In a second method, and referring to FIG. 4, the first stage may comprise measuring the actual clock frequency f' (400), calculating the frequency deviation Δf using the test system (not shown) (405), calculating the compensated constant C' according to Equation 2 using the test system (410), and storing the compensated constant C' in the memory 130 (415). The second stage may comprise powering the motor system (420), retrieving the compensated constant C' from the memory 130 (425), and transmitting the calculated compensated constant C' to the conversion circuit 155 (430). The third stage may comprise calculating the actual rotational speed R' using the calculated compensated constant C' and the conversion circuit 155 (440), controlling the rotational speed using the feedback control circuit 170, the drive control circuit 175, the level shifter circuit 110, the driver 115, the duty ratio calculation circuit 165 and/or the decoder 160 (445), measuring the cycle time via the counter 150 and generating the actual counter value t' (435), and updating the rotational speed (440) according to the actual counter value t'.

Figure 5:
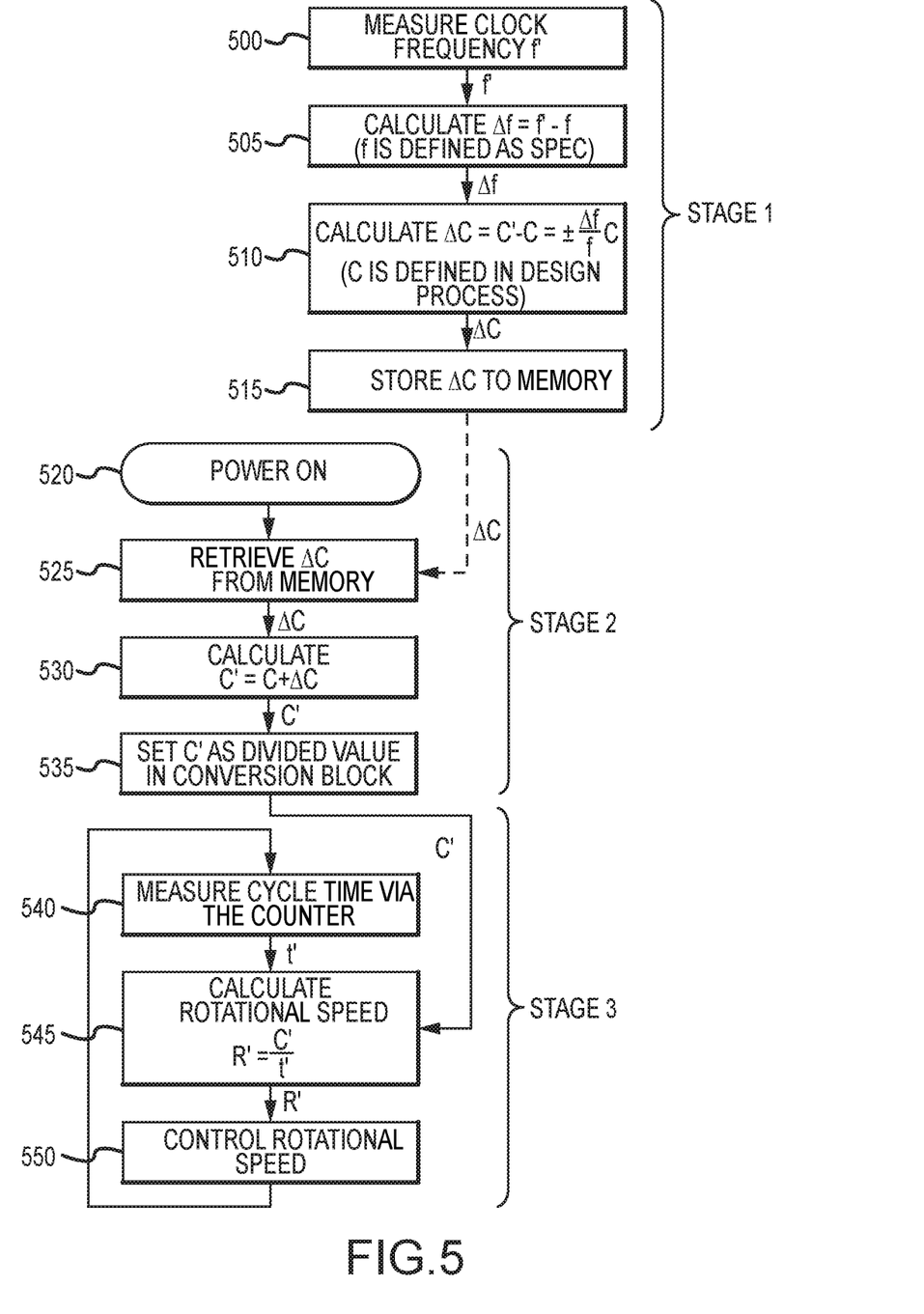
FIG. 5 is a third flowchart for operating a motor system in accordance with various embodiments of the present technology.

In a third method, and referring to FIG. 5, the first stage may comprise measuring the actual clock frequency f' (500), calculating the frequency deviation Δf using the test system (not shown) (505), calculating the change in constant ΔC according to Equation 3 using the test system (510), and storing the change in constant ΔC in the memory 130 (515). The second stage may comprise powering the motor system (520), retrieving the change in constant ΔC from the memory 130 (525), computing the compensated constant C' using the change in constant ΔC, (where C'=C+ΔC) using the calibration circuit 140 (530), and transmitting the calculated compensated constant C' to the conversion circuit 155 (535). The third stage may comprise calculating the actual rotational speed R' using the calculated compensated constant C' and the conversion circuit 155 (545), controlling the rotational speed using the feedback control circuit 170, the drive control circuit 175, the level shifter circuit 110, the driver 115, the duty ratio calculation circuit 165 and/or the decoder 160 (550), measuring the cycle time via the counter 150 and generating the actual counter value t' (540), and updating the rotational speed (545) according to the actual counter value t'.

Figure 6:
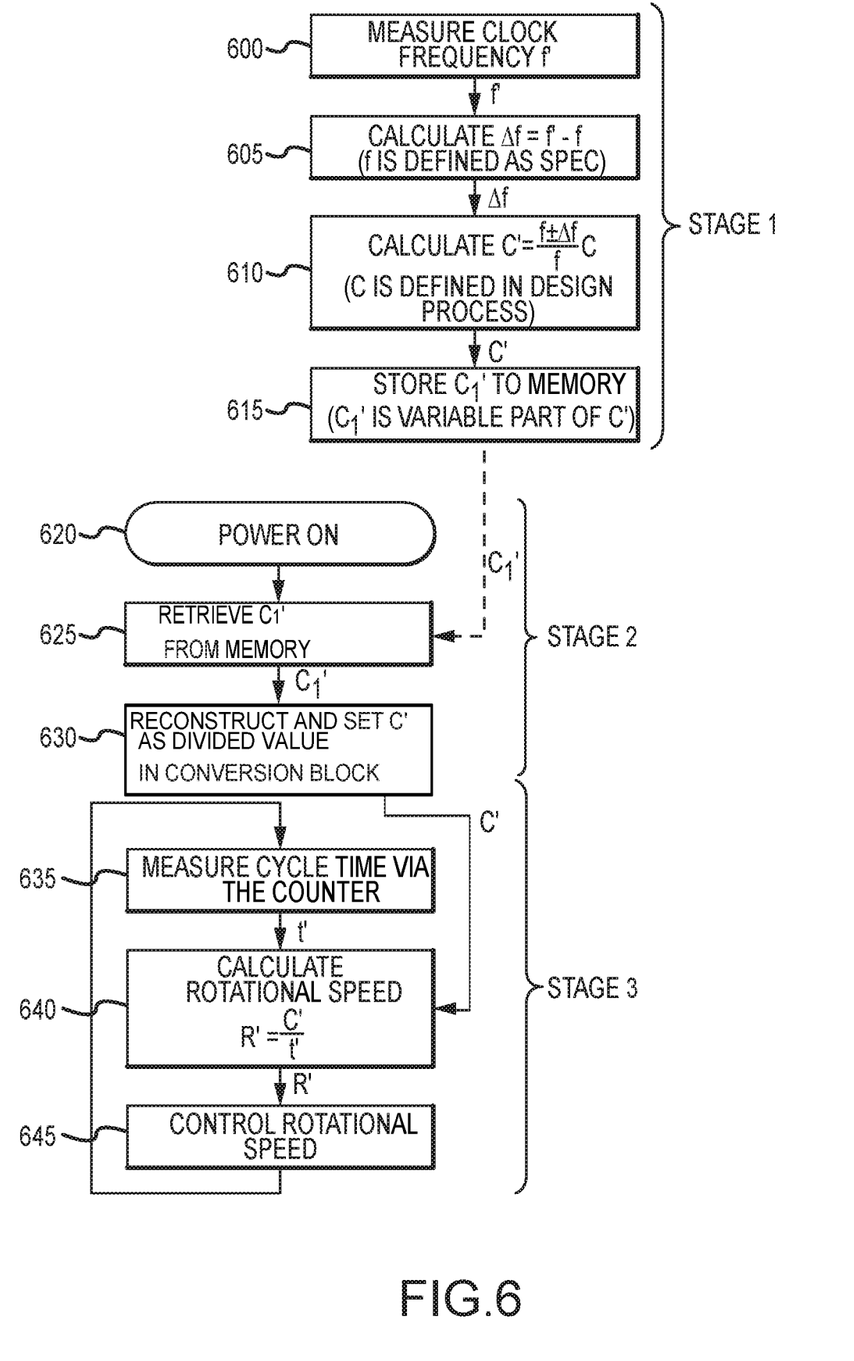
FIG. 6 is a fourth flowchart for operating a motor system in accordance with various embodiments of the present technology.

In a fourth method, and referring to FIG. 6, the first stage may comprise measuring the actual clock frequency f' (600), calculating the frequency deviation Δf using the test system (not shown) (605), calculating the compensated constant C' according to Equation 2 using the test system (610), and extracting the variable portion $C_1$' from the compensated constant C' and storing the variable portion $C_1$' in the memory 130 (615). The second stage may comprise powering the motor system (620), retrieving the variable portion of the compensated constant $C_1$' from the memory 130 (625), reconstructing the compensated constant C' based on the variable portion $C_1$' using the calibration circuit 140, and transmitting the calculated compensated constant C' to the conversion circuit 155 (630). The third stage may comprise calculating the actual rotational speed R' using the calculated compensated constant C' and the conversion circuit 155 (640), controlling the rotational speed using the feedback control circuit 170, the drive control circuit 175, the level shifter circuit 110, the driver 115, the duty ratio calculation circuit 165 and/or the decoder 160 (645), measuring the cycle time via the counter 150 and generating the actual counter value t' (635), and updating the rotational speed (640) according to the actual counter value t'.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A control circuit configured to connect to a motor and a clock generator circuit, comprising:
   a counter circuit configured to measure a cycle time of the motor and generate a counter value that represents the cycle time;
   a calibration circuit in communication with a memory, wherein the memory stores a delta clock frequency value defined as a difference between an actual frequency of the clock generator circuit and a known ideal frequency of the clock generator circuit;
      wherein the calibration circuit is configured to compute a compensated value using the delta clock frequency; and
   a conversion circuit connected to the calibration circuit and configured to:
      receive the compensated value; and
      compute a rotational speed of the motor according to the compensated value and the counter value;
   wherein the control circuit operates the motor according to the computed rotational speed.

2. The control circuit according to claim 1, wherein the counter circuit is connected to an input terminal of the conversion circuit and configured to transmit the counter value to the conversion circuit.

3. The control circuit according to claim 2, wherein the conversion circuit is further configured to compute the rotational speed of the motor based on the counter value.

4. The control circuit according to claim 1, wherein the control circuit further comprises a feedback control circuit connected to an output terminal of the conversion circuit.

5. The control circuit according to claim 4, wherein the control circuit is further configured to receive a pulse width modulation input signal and generate a target rotational speed according to the pulse width modulation input signal.

6. The control circuit according to claim 5, wherein the feedback control circuit is configured to:
   receive the target rotational speed and the computed rotational speed; and
   generate a drive signal according to the target rotational speed and the computed rotational speed.

7. The control circuit according to claim 1, wherein the compensated value is represented as a binary number having a predetermined number of bits and the memory stores the predetermined number of bits.

8. The control circuit according to claim 1, wherein the compensated value is represented as a binary number having a predetermined number of bits and the memory stores only a portion of the bits.

9. A method for operating a motor system with a motor, comprising:
   supplying the motor system with a clock signal having a known ideal frequency and an actual frequency;
   determining a frequency deviation comprising:
      measuring the actual frequency of the clock signal; and
      computing a change in frequency defined as a difference between the ideal frequency and the measured actual frequency;
   calibrating the motor system comprising:
      computing a compensated value according to the change in frequency, wherein the compensated value is represented as a binary number having a predetermined number of bits; and
      computing a rotational speed according to the compensated value; and
   controlling a rotational speed of the motor according to the computed rotational speed.

10. The method according to claim 9, further comprising measuring a length of time of a cycle of the motor.

11. The method according to claim 9, wherein controlling the rotational speed of the motor further comprises generating a feedback signal according to the computed rotational speed and controlling the rotational speed of the motor according to the feedback signal.

12. The method according to claim 9, wherein calibrating the motor system comprises computing the compensated value according to a predetermined constant and the ideal frequency.

13. The method according to claim 9, further comprising storing the predetermined number of bits to a memory.

14. The method according to claim 9, further comprising storing only a portion of the bits to a memory.

15. A system having a motor, comprising:
   a clock generator circuit configured to generate a clock signal having a known ideal frequency and an actual frequency;
   a memory configured to store a delta clock frequency defined as a difference between the known ideal frequency and the actual frequency;
   a control circuit connected to the motor and the clock generator circuit and having access to the memory, wherein the control circuit operates according to the actual frequency, and wherein the control circuit comprises:
      a calibration circuit having access to the memory and configured to:
         receive the delta clock frequency value; and
         compute a compensated value according to the delta clock frequency and a predetermined constant;
      a counter configured to measure a cycle time of the motor and generate a counter value according to the measured cycle time; and
      a conversion circuit connected to the calibration circuit and configured to:

receive the compensated value; and
compute a rotational speed of the motor according to the compensated value and the counter value;

wherein the control circuit operates the motor according to the computed rotational speed.

16. The system according to claim 15, wherein the control circuit further comprises a feedback control circuit connected to an output terminal of the conversion circuit.

17. The system according to claim 15, wherein the control circuit is further configured to receive a pulse width modulation input signal and generate a target rotational speed according to the pulse width modulation input signal.

18. The system according to claim 15, wherein the feedback control circuit is configured to:
receive the target rotational speed and the computed rotational speed; and
generate a drive signal according to the target rotational speed and the computed rotational speed.

19. The system according to claim 15, further comprising a feedback circuit connected to the motor and configured to detect an actual rotational speed of the motor.

* * * * *